Oct. 17, 1967  J. J. BUNDSCHUH  3,347,485
SPINDLE AND ADAPTER COMBINATION
Filed Jan. 13, 1966
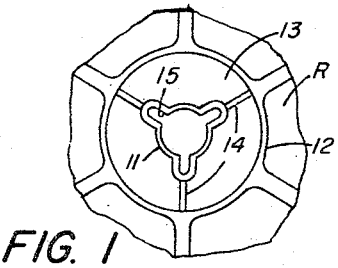
FIG. 1
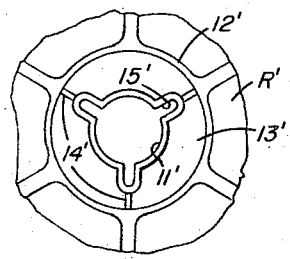
FIG. 2
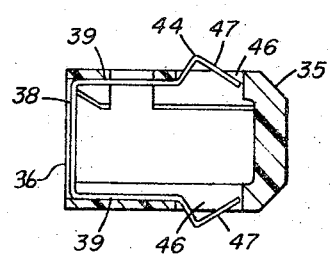
FIG. 7
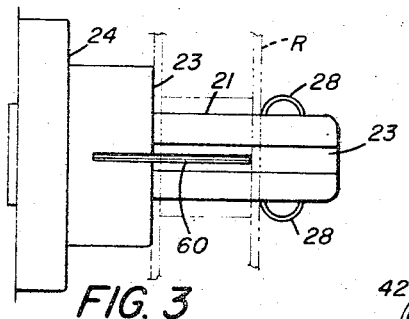
FIG. 3
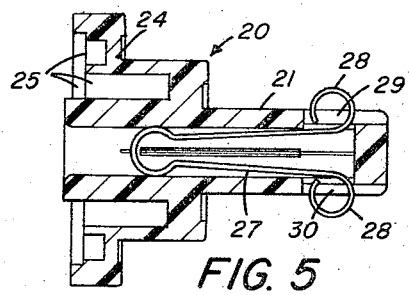
FIG. 5
FIG. 6
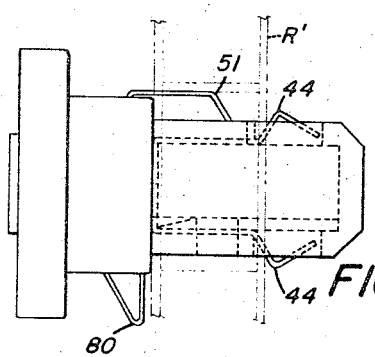
FIG. 8
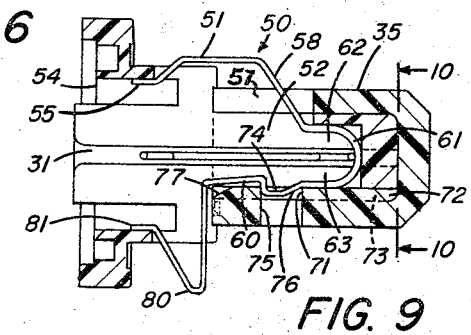
FIG. 9
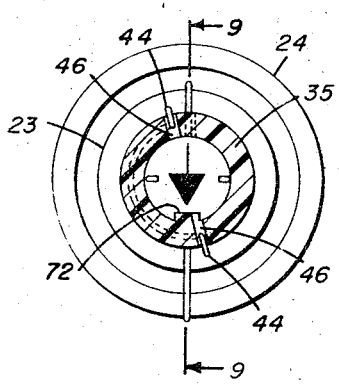
FIG. 10
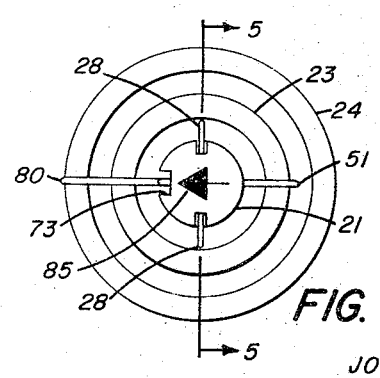
FIG. 4
JOHN J. BUNDSCHUH
INVENTOR.
BY Robert W. Hampton
Karl J. Kramer
ATTORNEYS

United States Patent Office 3,347,485
Patented Oct. 17, 1967

3,347,485
SPINDLE AND ADAPTER COMBINATION
John J. Bundschuh, Rochester, N.Y., assignor to Eastman Kodak Company, Rochester, N.Y., a corporation of New Jersey
Filed Jan. 13, 1966, Ser. No. 520,474
5 Claims. (Cl. 242—68.3)

The present invention relates to spindles for supporting reels of film, tape, etc., and particularly to a spindle and adapter combination which will accommodate reels having different core diameters.

In different web feeding apparatus having spindles which are to support supply reels of web material or take-up reels for such web material it is desirable that the spindles be able to accommodate reels whose cores differ in size and/or shape.

One such application with which the present invention is primarily concerned is a motion picture projector adapted to project both regular 8 mm. film and the new super 8 film. In order to prevent reels of super 8 film from being inadvertently placed on a projector designed to handle only regular 8 mm. film and vice versa, these two types of films are placed on reels whose cores have different diameters. More specifically, the reel for super 8 film has a core diameter which is larger than that of reels for regular 8 mm. film. This means that if a person tries to place a reel of super 8 film on a projector designed for use with regular 8 mm. film he will be unable to do so because the core of the super 8 reel is larger than the reel spindles for regular 8 mm. reels and the reel will flop around the spindle. The same is true if a person tried to place a reel of regular 8 mm. film on a projector designed to handle super 8 film, except that in this case the regular 8 reel will not go onto the super 8 spindle because the internal diameter of its core is smaller than the outside diameter of the super 8 spindle.

In designing motion picture projectors which are adapted to selectively project both of these 8 mm. types of film it is necessary to provide reel spindles which will accommodate both of these two types of reels.

To this end, the primary object of the present invention is to provide a spindle and adapter combination which will selectively accommodate film reels whose cores have different internal diameters. A further object is to provide a spindle and adapter combination which will, in selectively accommodating these different film reels, key both of them to the spindle to prevent relative rotation between the spindle and reels mounted thereon.

According to the present invention a spindle and adapter combination of the type described is provided in which a common key member is used to key both types of reels to the spindle; in which the adapter is latched in position on the spindle by a releasable latch member which can be manually released but is latched by merely slipping the adapter onto the spindle; and in which both the spindle and adapter have separate detent means for retaining a reel in a given axial position on the spindle. In a preferred form of this spindle and adapter combination the key member, releasable latch and release for the latch are formed from a single spring member which can be readily assembled onto the spindle and retained in assembled position by engagement between the spring member and recesses and/or slots in the spindle by reason of the resilient nature of the spring member.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawings, in which:

FIGS. 1 and 2 are partial side elevational views of film reels for regular 8 mm. and super 8 film, respectively, and showing how the core diameter of these two reels differ. In these figures the internal diameter of the cores do not correspond with the external diameters of the spindle and adapter shown in FIGS. 3–10, but are intended to show only the relative difference between the two core diameters;

FIG. 3 is an elevational view of a spindle, according to one embodiment of the present invention, adapted to accommodate a regular 8 mm. film reel;

FIG. 4 is an end elevational view of the spindle shown in FIG. 3;

FIG. 5 is a longitudinal sectional view taken substantially on line 5—5 of FIG. 4;

FIG. 6 is an end elevational view of the adapter for the spindle, and looking at the open end thereof;

FIG. 7 is a longitudinal sectional view taken substantially on line 7—7 of FIG. 6;

FIG. 8 is an elevational side view of the spindle with the adapter mounted thereon;

FIG. 9 is a longitudinal section view of the spindle adapter combination shown in FIG. 8 and taken substantially on line 9—9 of FIG. 10; and FIG. 10 is a cross-sectional view taken substantially on line 10—10 of FIG. 9.

Since regular 8 mm. and super 8 films have the same overall width and differ only in the size of the picture frame, perforation size and pitch, the reels for the two different types of film may have the same flange diameters, flange spacing and hub size. The reels for these two types of 8 mm. film differ only in the internal diameter of their cores as shown in FIGS. 1 and 2. The core 11 of the regular 8 mm. film reel R is spaced from the hub 12 by a web 13 having reinforcing ribs 14. To prevent rotation of the reel relative to the spindle after it is slipped onto the same, the core is provided with at least one keyway 15 which is adapted to engage a key member extending radially from the spindle. While these reels have three keyways 15 spaced equidistant about the core as shown in FIGS. 1 and 2, it will be appreciated that only one is needed and is used at any one time, the remaining ones being provided to make proper orientation of the reel on the spindle for driving engagement therewith more readily achieved.

Referring now to FIG. 2 wherein there is shown a reel R' for the new super 8 film, it will be seen that the main difference between this reel and that shown in FIG. 1 is that the internal diameter of the core 11' is larger, or about ½" as compared to 5⁄16". Since the keyways 15' in the super 8 reel are approximately the same depth as those in the regular 8 mm. reel and the hub 12' is generally the same size as the hub 12 of the regular 8 mm. reel, this means that the web 13' and the reinforcing ribs 14' in the super 8 reel are shorter than those in the regular 8 reel.

Because of this difference in the internal diameter of the driving cores on these two reels it will be appreciated that they cannot be interchangeably mounted on one and the same spindle and be properly supported in driving relations therewith. Accordingly, the present invention relates to a new spindle and adapter combination which permits accommodation of these two types of reels.

Referring now to FIGS. 3, 4, and 5 a spindle unit 20, which may be molded from a plastic material as indicated includes a spindle 21 whose external diameter is slightly less than the internal diameter of the core 11 of the regular 8 mm. reel to allow the core of this reel to be slipped onto the free end 22 of the spindle and be supported thereby. At a point spaced from its free end by a distance greater than the overall width of the core 11, the spindle is provided with a radial shoulder 23 against which one end of the reel core abuts when the reel is shoved onto the free end of the spindle as shown in FIGS. 3 and 8. This shoulder 23 forms the front wall of a stepped circular housing 24 the rear side of which is recessed as shown at 25 to receive means not shown for putting a frictional drag on the spindle if it is to be used as a supply spindle, or to drive the spindle if it is to be used as a take-up spindle. Since it is not significant to the present invention whether the spindle is driven or merely acts as a hold back, no mechanism has been shown acting on the spindle to achieve either of these results. All that is significant to the present invention in either of these respects is that the reel be connected to the spindle in driving relation therewith.

The spindle 21 is provided with detent means to hold the regular 8 mm. reel against the radial shoulder 23 and thereby position it in proper relation axially of the spindle and to prevent it from accidentally working off the end of the spindle. This detent means comprises a hairpin type of spring 27 the opposite ends of which are made circular, as shown at 28, and extend through diametrically disposed slots 29 and 30 in the spindle wall. When a regular 8 mm. reel is slipped onto the spindle the core 11 of the reel will cam the circular ends 28 of the spring 27 inwardly of the spindle and when the reel core is positioned against radial shoulder 23 the circular ends will snap outwardly again and engage the other end of the core against the shoulder, see dotted line position of reel in FIG. 3. The hairpin spring 27 can be readily assembled into the spindle by merely compressing the circular ends 28 together and shoving the spring into the open end of the spindle until the circular ends 28 find slots 29 and 30 and snap therethrough. To aid in orienting the circular ends 28 with the slots 29 and 30, the inside wall of the hollow spindle is provided with a pair of axial grooves 31 which are aligned with slots 29 and 30 and into which circular ends 28 are inserted when in their compressed condition, see FIG. 9.

For accommodating the super 8 reel an adapter 35, of the form best shown in FIG. 7, is slid onto the end of the spindle 21. This adapter is essentially a tubular member open at one end 36 and closed at the other end and has an internal diameter corresponding to the external diameter of the spindle. The external diameter of the adapter corresponds to the internal diameter of core 11' of the super 8 reel and when it is properly assembled on the spindle 21 its open end 36 will abut the radial shoulder 23, see FIG. 8. For holding the super 8 reel in proper position on the adapter against accidental removal therefrom the adapter is provided with a detent means which functions like the detent means on the spindle. Looking at FIGS. 6 and 7, this detent means comprises a wire spring 38 which is generally U-shaped and the arms 39 of which, instead of being joined by a straight cross member, are joined by an arcuate cross member 40, see FIG. 6, to leave the bore of the adapter open when the spring is mounted within the adapter in the manner shown in FIGS. 6 and 7. The inner wall of the adapter is provided with two diametrically opposed grooves 41 joined by an arcuate recess 42 in the end wall of the open end of the adapter which seat the arms 39 and cross member 40 of the spring 38 and leave the bore of the adapter completely open and at the same time confine the spring member within the adapter. The extreme ends of the arms 39 of the spring member 38 are bent to form projections 44 which extend through slots 46 in the wall of the adapter and slightly beyond the outside periphery thereof. Looking at FIG. 8 when a super 8 reel is slipped onto the adapter 35 the core thereof will engage the inclined leading end 47 of projection 44 and cam them downwardly onto the slots 46 to allow the core to move inside of the projections. When the reel is properly positioned on the adapter the projections will snap out to their normal position and engage the other end of the reel core to hold it up against the radial shoulder 23. Looking at FIGS. 3 and 8 it will be seen that the detent means of both the spindle and adapter assume the same axial position relative to shoulder 23 so as to position both types of reels in substantially the same plane. It will be understood that when the adapter 35 is slid onto the spindle 21 it will depress the circular ends 28 of the spindle detent spring 27 into slots 29 and hold them so depressed while the adapter is positioned on the spindle.

In accordance with the present invention one and the same means is used to key the regular 8 mm. reel on the spindle 21 and to key the super 8 reel on the adapter. Furthermore, this common keying means also constitutes a releasable latch for holding the adapter 35 in proper position on the spindle 21.

To this end, a wire spring 50 of the shape best shown in FIG. 9 is provided and assembled into the spindle. The trapezoidally shaped portions 51 of spring 50 extends radially through an axial slot 52 extending through the wall of the spindle and will engage one of the keyways 15 or 15' in the regular 8 mm. or super 8 reels, respectively, when they are slipped onto the spindle or adapter to drivingly connect the reels to the spindle. The forward wall of the circular housing 24 is provided with an axial slot 54 which lines up with the axial slot 52 in the spindle to allow the extreme rear end 55 of the key portion to extend into the recess 25 in the housing and engage the inner periphery thereof. It is this engagement of the rear end 55 of the key member with the interior of recess 25 which keeps the key member from popping out of the spindle 21 and limits the extent to which it normally extends radially beyond the spindle periphery. The key portion 51 must extend radially from the periphery of the spindle by a sufficient amount to engage one of the keyways 15' in a super 8 reel when it is slipped onto the adapter 35. To permit this the wall of the adapter is provided with an axial slot 57 which lines up with the axial slot 52 in the spindle when the adapter 35 is properly oriented on the spindle 21 as will be described below. The inwardly inclined portion 58 of the key portion 51 will permit the leading end of either reel core to cam the key portion 51 inwardly by a sufficient amount to permit the cores to be slid onto either the spindle 21 or the adapter 35 even if a keyway of the cores is not aligned with key portion 51. If a keyway of the reel cores is not aligned with the key portion when the reels are slipped on the spindle or adapter then the reel need only be rotated less than 120° in either direction to line up a keyway with the key portion and at which time the key portion will snap into engagement with the keyway by virtue of the inherent resiliency of the spring 50.

For releasably latching the adapter 35 on the spindle 21 in proper orientation the following structure, as best seen in FIG. 9, is provided. The spring member 50 is formed to have an arm 60 which is joined to the key portion 51 by a loop portion 61 which provides a spring action tending to move key portion 51 and arm 60 apart. The spring member 50 is held in proper oriented relation within the spindle by the loop portion 61 and parts of key portion 51 and arm 60 thereof engaging diametrically opposed axial grooves 62 and 63, respectively, in the inner wall of the spindle, and which grooves open out onto the rear end of the spindle. Spring 50 is assembled into the interior of the spindle by merely compressing key portion 51 and the arm 60 together and pushing the loop end 61 first into the open end of the spindle. When the spring reaches its proper position key portion 51 will snap through axial slot 52 in the spindle, and parts of arm 60 will snap through slots in the spindle wall as will be described below to prevent the spring from sliding rearwardly out of the open end of the spindle.

For properly orienting the adapter 35 with respect to the spindle 21 when it is slid thereon the inside wall of the adapter is provided with a radial rib 72 extending therefrom which engages an axial groove 73 extending axially of the outside wall of spindle 21 and extending from the free end of the spindle to the radial shoulder 23. The arm 60 includes an offset latch member 74 which extends through a slot 71 in the spindle wall and opening into said groove. The wall of the adapter 35 is provided with a radial opening 75 which extends from the outside and through the rib 72. When the adapter 35 is slid onto the spindle 21 the offset latch member 74 will snap into the opening 75 in the rib and that portion of the offset latch member which extends substantially radially of the spindle will engage the wall of the opening and positively latch the adapter on the spindle. So that the latch member 74 won't unduly impede the adapter 35 being slid onto the spindle, the forward end of the latch member is inclined as indicated at 76 and the rear end of the rib 72 is inclined as shown at 77. This insures that the latch member will be readily cammed inwardly of the spindle to a released position or the adapter 35 is slid onto the spindle. For latching purposes the rib 72 could be merely provided with a notch into which the offset latch member 74 would snap rather than having the opening 75 go all of the way through the spindle wall and rib as shown. This opening 75 is provided merely because it is an easier way to a shoulder or recess in the rib than merely forming a notch therein.

For the purpose of manually releasing the latch to permit removal of the adapter 35 from the spindle, the extreme inner end of arm 60 of the spring 50 is provided with an offset portion 80 which extends through a radial slot 81 in the housing 24 which opens into the interior of the spindle 21. It will be noticed that the offset portion 80 lies entirely beyond the radial shoulder 23 so that it does not interfere with the reels when they are mounted on the spindle or adapter. The extreme end 81 of offset portion engages the inner periphery of housing 24 to limit the extent to which the arm 60 can spread radially outwardly when the adapter 35 is removed from the spindle 21. To aid in properly orienting the adapter 35 when it is to be placed on the spindle 21 the end of the spindle may be provided with an arrow 85 pointing to the axial groove 73 with which the rib 72 on the interior of the adapter 35 must be aligned to permit the adapter 35 to be slipped onto the spindle.

From the above description it will be seen that the present combination spindle and adapter provides means whereby reels having different core diameters can be selectively accommodated by merely slipping an adapter onto a spindle or removing it therefrom. The combination is such that a single means can be used to key both types of reels to the spindle and said single means also provides a releasable latch means for holding the adapter on the spindle in proper orientation relative thereto. Detent means are also provided for releasably holding the different reels on the spindle and/or adapter. The arrangement of parts is such that detent means, the reel keying means and the releasable latch for the adapter can be readily assembled without the use of tools and will be held in assembled relation by virtue of the interengagement of the parts rather than requiring separate fastening means, e.g., screws, adhesive, riveting, etc.

Having thus described my invention, what I claim as new and desire to secure by Letters Patent of the United States is:

1. A spindle and adapter combination for selectively accommodating two types of film reels whose cores have different internal diameters and wherein the inner surface of each core is provided with a keyway extending longitudinally thereof and radially therefrom and opening through at least one end of the core, and comprising
   (1) a spindle whose outside diameter corresponds to the inside diameter of the smaller of said cores so that the type of reel having said smaller core can be slid onto said spindle;
   (2) a tubular adapter slidable onto said spindle and having an outside diameter corresponding to the inside diameter of the larger of said reel cores so that a reel having said larger core can be slid onto said adapter;
   (3) a releasable latch means permitting said adapter to be slid onto said spindle and thereafter holding it from being axially displaced therefrom;
   (4) a key member carried by said spindle and movable radially thereof between a normal position, wherein it is adapted to engage the keyway in said reel having the core of larger internal diameter, and a second position, wherein it is adapted to engage the keyway in the core of said other reel; and
   (5) means for moving said key member from said normal position to said second position upon placement of said other reel on said spindle.

2. A spindle and adapter combination according to claim 1, including
   (1) a radial shoulder integral with said spindle which one end of the core of each reel is adapted to abut when said reels are placed on said spindle or adapter; and
   (2) detent means on both said spindle and adapter to engage the other end of a reel core slipped thereon and which in combination with said shoulder confines the core to a given axial position thereon;
      (a) said detent means on said spindlt arranged to be depressed radially inward of said spindle when said adapter is slipped onto said spindle.

3. A spindle and adapter combination according to claim 1 in which said releasable latch means and said key member are formed from a single spring member which includes an accessible finger piece, depression of which releases said latch to permit removal of said adapter from said spindle.

4. A spindle and adapter combination according to claim 1 in which said adapter is provided with an axial slot through which said key member when in its normal position extends to engage the keyway in a core slipped onto said adapter, and in which the inner wall of said adapter is provided with a latch member to be engaged by said releasable latch means when said adapter is slipped onto said spindle, said spindle provided with an axial groove opening onto the end of said spindle and into which said latch member on the adapter extends when the adapter is slipped onto said spindle to orient the spindle and adapter so that said axial slot in the adapter receives said key member and said latch member on the adapter engages said releasable latch means.

5. A spindle and adapter combination according to claim 1 in which said spindle is hollow and in which the periphery of said spindle is provided with a pair of axial slots opening into the cavity of said spindle and diametrically disposed relative to one another; and in which said releasable latch means and said key member are formed in opposite arms of a single spring member doubled back on itself so that said opposite arms are normally separated in a common plane with said releasable latch means and said key member extending radially through opposite ones of said axial slots; that arm of the spring member including said releasable latch having a finger piece formed therein in coplanar and axially spaced relation to said releasable latch means and extending radially through one of said axial slots in said spindle to be accessible for manual depression to move said releasable latch to its release position.

References Cited

UNITED STATES PATENTS

| | | | |
|---|---|---|---|
| 1,957,884 | 5/1934 | Green | 242—68.3 |
| 2,087,002 | 7/1937 | Mieble | 242—68.3 |
| 2,546,387 | 3/1951 | Coffing | 279—79 |
| 2,982,586 | 5/1961 | Gliehe | 306—28 |

FRANK J. COHEN, *Primary Examiner.*

B. S. TAYLOR, *Assistant Examiner.*